No. 743,586. PATENTED NOV. 10, 1903.
S. B. STORER.
MAGNETIC SPEED INDICATOR.
APPLICATION FILED JUNE 4, 1903.
NO MODEL.
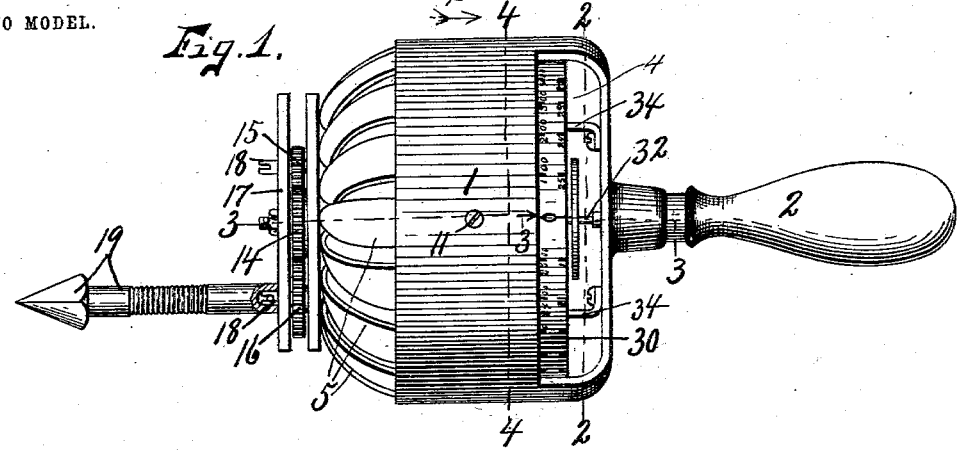
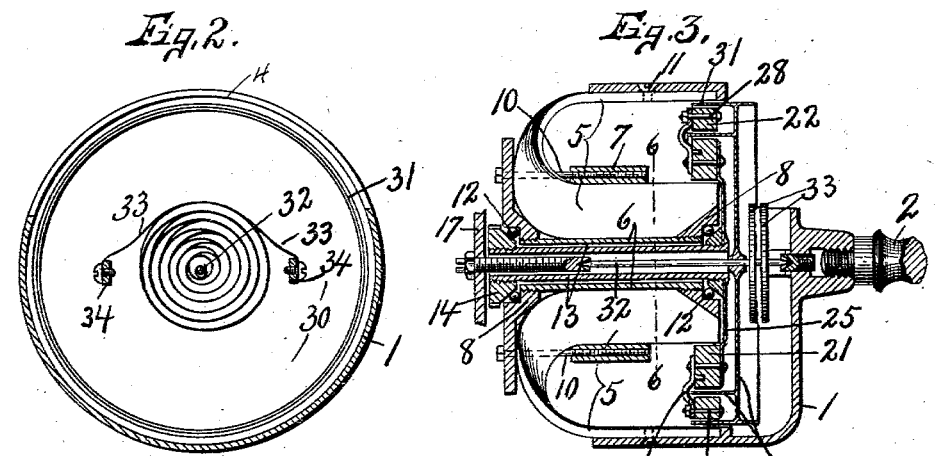
Witnesses:
F. E. Arthur
H. E. Chase
Inventor.
Simon B. Storer
By Howard P. Denison
Attorney.

No. 743,586.

Patented November 10, 1903.

UNITED STATES PATENT OFFICE.

SIMON B. STORER, OF SYRACUSE, NEW YORK.

MAGNETIC SPEED-INDICATOR.

SPECIFICATION forming part of Letters Patent No. 743,586, dated November 10, 1903.

Application filed June 4, 1903. Serial No. 160,018. (No model.)

*To all whom it may concern:*

Be it known that I, SIMON B. STORER, of Syracuse, in the county of Onondaga, in the State of New York, have invented new and useful Improvements in Magnetic Speed-Indicators, of which the following, taken in connection with the accompanying drawings, is a full, clear, and exact description.

My invention relates to certain improvements in magnetic speed-indicators of the class set forth in my Patent No. 680,988, dated August 20, 1901, and also in my pending applications, Serial No. 137,747, filed January 3, 1903, and Serial No. 152,884, filed April 16, 1903. In each of these cases a revoluble element is rotated in the field of a permanent magnet by any revolving part the speed of which is to be determined to cut the magnetic lines of force which act inductively upon an oscillatory member to draw the same from its normal position of rest, the amount of movement being proportionate to the speed of the revoluble element, and the instrument therefore is calibrated on this basis by graduating the periphery of the oscillatory member with reference to a fixed point.

One of the objects of my present invention is to produce an increased electromotive force by arranging a series of permanent magnets side by side and concentrically around the axis of the revolving element, with their opposite poles extending in the same direction, so that the inner poles are all of one polarity and the outer poles are all of the opposite polarity.

Another object is to provide means to facilitate the calibration of the instrument and to produce a magnetic damping effect upon the oscillating member when the device is in action.

Further objects will appear in the subsequent description.

In the drawings, Figure 1 is a top plan of a magnetic speed-indicator embodying the features of my invention. Figs. 2, 3, and 4 are sectional views taken, respectively, on lines 2 2, 3 3, and 4 4, Fig. 1, Fig. 4 looking in the direction indicated by arrow $x$. Fig. 5 is an end view of one of the detached U-shaped magnets or bars. Fig. 6 is a sectional view taken on line 6 6, Fig. 3.

Similar reference characters indicate corresponding parts in all the views.

In carrying out the objects stated I provide a shell or casing 1 with a suitable handle 2, by which the shell is held in a fixed position when testing the speed of any revoluble part, said shell being formed with a fixed index-mark 3 and sight-opening 4, through which the graduations on the oscillatory member may be readily seen, the end of the shell opposite to the handle being open to receive the magnets and other parts presently described.

A series of separate permanent magnets 5 are arranged side by side upon the periphery of a cylindrical sleeve 6 and concentric with its axis, so as to form a circular row of magnets with their arms or poles extending in the same general direction parallel with said axis. Each of these magnets preferably consists of a flat bar of tungsten steel or equivalent metal which is twisted or bent so that its inner arm is disposed edgewise with reference to the periphery of the sleeve 6, while its outer arm is disposed flatwise with reference to said periphery, the inner arms being of one polarity and the outer arms are of an opposite polarity to avoid any neutralizing magnetic effects. A collar 7 is slipped over the outer edges of the inner arms and operates to hold the magnets in position and to lock them to the sleeve 6, while the outer arms are disposed in a substantially circular plane and fit closely within the shell or casing 1, the latter serving to additionally hold the magnets in their proper relative positions. The opposite ends of the sleeve 6 are provided with annular shoulders or heads 8, which abut against the adjacent ends of the inner arms of the magnets to hold them from endwise displacement, the head 8 adjacent to the closed sides of the magnets being enlarged and is perforated at intervals to receive clamping-bolts 10, which engage threaded apertures in the collar 7 and operate to draw the collar toward the head, and thereby firmly secures the magnets in place. These magnets are all of uniform size, and the outer arms are therefore disposed side by side concentric with the sleeve 6, but are slightly separated from each other, so that each magnet maintains its individual magnetic force. It is thus seen that the magnets 5 are closely fitted within the shell or casing 1 around the sleeve 6 and are additionally fixed from rotary movement by suitable fastening means, as screws 11, which lock the shell and magnets together.

Journaled within the sleeve 6 upon suitable ball-bearings 12 is a hollow rotary shaft 13, having a gear 14 fixed to one of its ends and to which motion is imparted by one of two driving-gears 15 and 16 of unequal size, each of the latter gears being journaled in a fixed bar 17 and is provided with a clutch-spindle 18. A spur 19 is adapted to be interlocked with one of these clutch-spindles and applied to the rotary part the speed of which is to be determined, whereby similar rotary motion is imparted to the hollow shaft 13. Secured to the opposite end of this hollow shaft is a rotary armature, which revolves in the space between the opposite poles of the magnets and consists of inner and outer annular rings or sections 21 and 22, having radial teeth or arms 23 and 24, projecting toward each other. The inner section or ring 21 is united to the hollow shaft 13 by a plate or extension 25, and the outer ends of the teeth or arms 23 are separated from each other to form spaces of substantially the same circumferential width as the width of the teeth, while the outer ring or section encircles the inner section and is adjustable circumferentially with reference to the inner section and rotates therewith, the inner ends of the teeth of the outer section being also separated to form spaces between. These sections 21 and 22 are united to each other by suitable brackets 27, which are slotted circumferentially to receive clamping-screws 28 and to permit the circumferential adjustment of the outer section, said clamping-screws serving to hold the outer section in its adjusted position. The adjacent end faces of the teeth of the outer and inner armature-sections are slightly separated from each other to form an annular space, in which is movable an oscillatory member 30, of low-resistance material, and a similar annular space is left between the periphery of the outer section 22 and inner faces of the outer poles of the magnets to receive an extension 31 of the oscillatory member 30. This oscillatory member is mounted upon a rotary spindle 32 and is biased to a normal position of rest by oppositely-acting springs 33, having their inner ends secured to the spindle 32 and their outer ends secured to fixed supports 34, so that when the member 30 is rocked in one direction one of the springs is tensioned and when rocked in the other direction the other spring is tensioned. It is now apparent that the armature-sections 21 and 22 and the oscillatory member 30, with its extension 31, are cut by the same magnetic lines of force and that when the armature is rotated in testing the speed of any revolving part an induced current is set up and acts inductively upon the oscillatory member to drag it from its normal position of rest in the direction of rotation of the armature, the inductive effect or degree of pull exerted upon the oscillatory member being proportionate to the speed of rotation of the armature. The instrument is therefore calibrated on this basis by graduating the periphery of the oscillatory member in opposite directions from a zero-point which is normally registered with a fixed point 3 on the case when the oscillatory member is at rest, so that the speed of rotation in either direction may be accurately measured by the amount of movement of the member 30 with reference to the fixed point.

It will be observed that each magnet of the concentric series acts independently of the others, and therefore the total magnetic effect or efficiency of the combined magnets is greatly superior to one in which the poles are continuous—that is, the electromotive force developed by the rotation of the armature in the fields is itensified, and the inductive effect upon the oscillatory member to drag it from its normal position of rest is consequently increased, so that the action is more instantaneous and is more readily operable under low speeds of the armature. It is thus seen that a series of independent magnetic circuits are set up through the poles of the individual magnets and that the rotary and oscillatory elements are cut by the lines of force of each of the magnets and that by interposing a portion of the oscillatory member between the adjacent faces of the teeth of each of the armature-sections when the armature is rotated the tufted or bunched lines of force passing through the teeth exert a degree of pull upon the oscillatory element proportionate to the speed of rotation of the armature which drags it from its normal position of rest against the action of one or the other of the springs 33, according to the direction of rotation of the armature.

Another important factor in determining the electomotive force and inductive action is the position of the teeth of the armature-rings with relation to each other.

It will be noticed that the inner ends of the teeth of the inner ring are united to each other and that the outer ends of the teeth of the outer ring are also united to each other, and therefore the lines of force are more or less evenly distributed at these junctions of the teeth, but are tufted or bunched together in their passage through the teeth from one pole of the magnet to the other. It now becomes apparent that when these teeth are in radial alinement with each other, as seen in Fig. 4, the inductive effect upon the oscillatory member which is interposed between the contiguous faces of the teeth is greatest; but if the teeth of one ring—as, for instance, the outer ring or section 22—are shifted circumferentially with relation to the teeth of the inner ring so as to overlap the spaces between the teeth of said inner ring the magnetic lines of force are distributed over a greater area, and therefore the inductive effect upon the oscillatory element is diminished, so that if the teeth of the outer ring are shifted so as to cover the spaces between the teeth of the inner ring the distribution of the magnetic lines of force is substantially uniform, and therefore no current is generated by the rotation of the armature sufficient to exert any influence upon the oscillatory member to move it from its normal position of rest. It will thus be seen that the degree of the pull exerted upon the oscillatory member is controlled by two forces, one being the speed of rotation of the armature in the fields of the magnets and the other the position of the teeth of the armature-sections with reference to each other, and that in calibrating the instrument under a known speed the outer ring or section may be adjusted circumferentially to vary the distribution of the lines of force, and thereby facilitate such calibration.

As previously intimated, the oscillatory member is constructed of low-resistance material, and a portion thereof, as 31, is projected or extended between the periphery of the outer armature-section 22 and the inner faces of the outer poles of the magnets and operates as a "dead-beat" or "damping" device to prevent undue oscillation or vibration of the oscillating member and enables it to reach its reading quickly.

The operation of my invention is as follows: The operator holds the device by the handle 2, with the spur 19 engaged with the revoluble part the speed of which is to be determined. The spur is thus rotated by the revoluble part and transmits rotary motion to the armature through the medium of the gear 14, sleeve 13, and yoke or plate 25, it being understood that the outer section of the armature is secured to the inner section by the brackets 27, so that both sections rotate together. This rotation of the armature cuts the lines of force and sets up an electric current in the portion of the oscillatory element which is interposed between the teeth of the armature-sections and operates to drag the oscillatory element from its normal position of rest in the direction of the rotation of the armature, the amount of movement of the oscillatory element being proportionate to the speed of the rotation, which movement is indicated by graduations upon the periphery of the oscillatory element with reference to the fixed point 3. During this movement of the oscillatory member certain induced currents are set up in the extension 31, which offer resistance to the quick vibrations of the oscillatory element and tend to bring it quickly to reading position.

Having thus described my invention, what I claim, and desire to secure by Letters Patent, is—

1. A series of separate horseshoe-magnets having inner and outer poles arranged in concentric rows, an armature and a low-resistance part in the field and cut by the same lines of force, one of the latter parts being rotary and the other oscillatory and biased to a normal position of rest.

2. A series of separate horseshoe-magnets having inner and outer poles arranged in concentric rows, those of the inner row being of one polarity and those of the outer row of opposite polarity, an armature and a low-resistance part both in the field of the magnets, one of the latter elements being rotatable and the other oscillatory and biased to a normal position of rest.

3. A magnetic speed-indicator comprising separate permanent magnets having poles of opposite polarity arranged in concentric rows, an armature and a low-resistance element movable between the opposite poles, one being rotary and the other oscillatory and biased to a normal position of rest, the current set up by the rotary element acting inductively upon the oscillatory element to drag the latter from its normal position.

4. A magnetic speed-indicator comprising separate U-shape permanent magnets arranged side by side in a circle, two elements movable in the field of the magnets and cut by the same lines of force, one of the elements being rotary and the other oscillatory and biased to a normal position of rest, the rotary element acting inductively on the oscillatory element to move it from its position of rest.

5. A magnetic speed-indicator comprising a field-magnet an armature and a low-resistance part both in the field and cut by the same lines of force, the armature being composed of annular rings having teeth facing each other, one of the rings being adjustable circumferentially with reference to the other to vary the distribution of the lines of force, and the low-resistance element being oscillatory and projecting between said teeth and biased to a normal position of rest.

6. In a magnetic speed-indicator, a series of separate field-magnets having like poles arranged in concentric rows, an armature and a low-resistance part in the fields, one of the parts being rotary and the other oscillatory, and magnetic damping means for the oscillatory part.

7. In a magnetic speed-indicator, a series of separate field-magnets having like poles arranged in concentric rows, a rotary element of soft iron and an oscillatory low-resistance part both cut by the same lines of force, the rotary element acting inductively on the oscillatory part to drag it along, said oscillatory part having an extension also cut by the lines of force and influenced by induction to dampen the vibration of the oscillating part.

8. A magnetic speed-indicator comprising separate field-magnets having like poles arranged in concentric rows, a rotary armature between the opposite poles and composed of annular sections having teeth facing each other, but separated to form an annular space, an oscillatory low-resistance part projecting into said space and having an extension movable between the outer armature-section and outer poles of the magnets whereby the magnetic damping effect is produced upon the oscillatory member.

In witness whereof I have hereunto set my hand this 25th day of May, 1903.

SIMON B. STORER.

Witnesses:
H. E. CHASE,
MILDRED M. NOTT.